United States Patent [19]
Sarp et al.

(10) Patent No.: US 10,933,399 B2
(45) Date of Patent: Mar. 2, 2021

(54) METHOD OF REMOVING BARIUM FROM A LIQUID

(71) Applicant: QATAR FOUNDATION FOR EDUCATION, SCIENCE AND COMMUNITY DEVELOPMENT, Doha (QA)

(72) Inventors: Sarper Sarp, Canakkale (TR); Muataz A. Hussien, Doha (QA); Nidal Hilal, West Cross (GB); Ahmed Mohammed Fard, Doha (QA); Marwan K. Khraisheh, Lexington, KY (US); Tarik Rhadfi, Doha (QA); Hughes Preud'Homme, Lons (FR)

(73) Assignee: QATAR FOUNDATION FOR EDUCATION, SCIENCE, AND COMMUNITY DEVELOPMENT, Doha (QA)

(*) Notice: Subject to any disclaimer, the term of this patent is extended or adjusted under 35 U.S.C. 154(b) by 289 days.

(21) Appl. No.: 15/932,211

(22) Filed: Feb. 16, 2018

(65) Prior Publication Data

US 2018/0250651 A1 Sep. 6, 2018

Related U.S. Application Data

(60) Provisional application No. 62/467,778, filed on Mar. 6, 2017.

(51) Int. Cl.
*B01J 20/02* (2006.01)
*B01J 20/30* (2006.01)
(Continued)

(52) U.S. Cl.
CPC ....... *B01J 20/0274* (2013.01); *B01J 20/0211* (2013.01); *B01J 20/3085* (2013.01);
(Continued)

(58) Field of Classification Search
CPC .... B01J 20/0211; B01J 20/0248; B01J 20/30; B01J 20/0274; B01J 20/3085;
(Continued)

(56) References Cited

U.S. PATENT DOCUMENTS 6,200,483 B1  3/2001  Cutler et al.
7,608,190 B1  10/2009  Banerjee et al.
(Continued)

FOREIGN PATENT DOCUMENTS

CN    102463000 A       5/2012
CN    104192967 A  *  12/2014
CN    106268610 A  *   1/2017

OTHER PUBLICATIONS

Ahmadun et al. Review of technologies for oil and gas produced water treatment. Journal of Hazardous Materials 170 (2009) 530-551. (Year: 2009).*

(Continued)

*Primary Examiner* — Katherine Zalasky McDonald
(74) *Attorney, Agent, or Firm* — Nath, Goldberg & Meyer; Richard C. Litman

(57) ABSTRACT

A method of removing barium from a liquid includes adding a two-dimensional metal carbide water contaminant adsorbent to water to adsorb contaminants, such as barium (II), from the liquid. The two-dimensional metal carbide water contaminant adsorbent is in the form of at least one MXene, having the formula $M_{n+1}X_n$, where n=1, 2 or 3, M is an early transition metal, such as scandium (Sc), titanium (Ti), vanadium (V), chromium (Cr), yttrium (Y), zirconium (Zr), niobium (Nb), molybdenum (Mo) or the like, and X is either carbon or nitrogen. The MXene may be $Ti_3C_2$. The liquid may be, for example, at least one water by-product from at least one oilfield reservoir, such as produced water, co-produced water or a combination thereof.

3 Claims, 15 Drawing Sheets

(51) Int. Cl.
  *C02F 1/28* (2006.01)
  *C01B 32/921* (2017.01)
  *C02F 103/10* (2006.01)
  *C02F 103/36* (2006.01)
  *C02F 101/10* (2006.01)

(52) U.S. Cl.
  CPC ............ *C01B 32/921* (2017.08); *C02F 1/281* (2013.01); *C02F 2101/10* (2013.01); *C02F 2103/10* (2013.01); *C02F 2103/365* (2013.01)

(58) Field of Classification Search
  CPC ... B01J 20/3071; C02F 1/281; C02F 2101/10; C02F 2101/20; C02F 2103/10; C02F 2103/34; C02F 2103/36; C02F 2103/365; C01B 32/921; B01D 15/00
  See application file for complete search history.

(56) References Cited

U.S. PATENT DOCUMENTS

| | | | |
|---|---|---|---|
| 8,709,259 | B2 | 4/2014 | Douglas, Sr. |
| 2014/0069821 | A1 | 3/2014 | Marcin et al. |
| 2014/0162130 | A1* | 6/2014 | Barsoum ............... C07C 233/03 429/231.8 |
| 2017/0088429 | A1* | 3/2017 | Shin ....................... C01B 32/921 |
| 2017/0294546 | A1* | 10/2017 | Ghidiu ................. H01L 51/5203 |
| 2018/0108910 | A1* | 4/2018 | Barsoum ................. C30B 29/36 |

OTHER PUBLICATIONS

Fard et al. Barium removal from synthetic natural and produced water using MXene as two dimensional (2-D) nanosheet adsorbent. Chemical Engineering Journal 317 (2017) 331-342. (Year: 2017).*

Guo et al. Heavy-Metal Adsorption Behavior of Two-Dimensional Alkalization-Intercalated MXene by First-Principles Calculations. J. Phys. Chem. C 2015, 119, 20923-20930. (Year: 2015).*

Ling et al. Flexible and conductive MXene films and nanocomposites with high capacitance. PNAS, Nov. 25, 2014, vol. 111, No. 47, 16676-16681. (Year: 2014).*

Naguib et al. Two-Dimensional Nanocrystals Produced by Exfoliation of Ti3AlC2. Adv. Mater. 2011, 23, 4248-4253. (Year: 2011).*

Peng et al. Unique Lead Adsorption Behavior of Activated Hydroxyl Group in Two-Dimensional Titanium Carbide. J. Am. Chem. Soc. 2014, 136, 4113-4116. (Year: 2014).*

Rasool et al. Water treatment and environmental remediation applications of two-dimensional metal carbides (MXenes). Materials Today. vol. 30, Nov. 2019, p. 80-102. (Year: 2019).*

Ren et al. Charge- and Size-Selective Ion Sieving Through Ti3C2Tx MXene Membranes. J. Phys. Chem. Lett. 2015, 6, 4026-4031. (Year: 2015).*

Ying et al. Two-Dimensional Titanium Carbide for Efficiently Reductive Removal of Highly Toxic Chromium(VI) from Water. ACS Appl. Mater. Interfaces 2015, 7, 1795-1803. (Year: 2015).*

* cited by examiner

METHOD OF REMOVING BARIUM FROM A LIQUID

CROSS-REFERENCE TO RELATED APPLICATION

This application claims the benefit of U.S. Provisional Patent Application Ser. No. 62/467,778, filed on Mar. 6, 2017.

BACKGROUND OF THE INVENTION

1. Field

The disclosure of the present patent application relates to the removal of water contaminants, and particularly to the removal of barium from water.

2. Description of the Related Art

Scale formation is one of the primary operational concerns in oilfield reservoirs. Barite or barium sulfate scale is formed when two incompatible types of impure water come into contact with one another. Waters are called "incompatible" when they interact chemically to form deposits and scale whenever they are mixed. Seawater contains high concentrations of $SO_4^{-2}$, and $CO_3^{-2}$. Produced and co-produced water in oilfield reservoirs typically have large amounts of $Ba^{2+}$, $Ca^{2+}$ and $Sr^{2+}$. When these two types of water mix, scale forms in the reservoir, typically in the form of $CaSO_4$, $BaSO_4$ and $SrSO_4$. The formation of such scale typically occurs during the process of reinjection of produced water into the oil well for maintaining the pressure within the reservoir. In order to reduce the salinity of the produced water (which typically reaches 300,000 ppm), it is mixed with seawater prior to the injection. Variables such as temperature and pressure hasten the scale formation process.

The damage caused by scale formation can be very large in scale, including blockages in tubes, pumps, flow lines, heaters and chillers, as well as fully shutting down the production line. Due to the large economical and operational costs involved, any injection of produced/coproduced water without removal of barium should be avoided.

Typical methods for the removal of barium from produced and co-produced water include ion exchange filtering, reverse osmosis filtering, solvent extraction, membrane filtration, adsorption, and precipitation. With the exception of adsorption, these methods are relatively inefficient, costly, and require additional equipment to manage sludge produced by the process. With regard to adsorption, there has been research involving the usage of natural dolomite, as well as natural kaolinite and chlorite-illite clays, to remove barium from water. However, although these techniques are not costly and do not produce significant amounts of sludge, the adsorption efficiency of these materials is not high enough for realistic implementation.

There has been further recent research into using carbon-based nanomaterials for the removal of heavy metals from water. Examples of such nanomaterials include activated carbon, carbon nanotubes, fly ash, chitosan and graphene derivatives. The effectiveness of such techniques varies greatly and the production of nanomaterials, at present, is relatively costly, with only very low quantities of desired materials being produced. Thus, a method of removing barium from a liquid solving the aforementioned problems is desired.

SUMMARY

The method for removing barium from a liquid includes using at least one compound from a group of layered ternary carbides and nitrides, known as MAX phases, to adsorb contaminants, such as barium (II), from a liquid. MAX phases have the general formula $M_{n+1}AX_n$, where n=1, 2 or 3, where M is an early transition metal, such as scandium (Sc), titanium (Ti), vanadium (V), chromium (Cr), yttrium (Y), zirconium (Zr), niobium (Nb), molybdenum (Mo) or the like, A is an A-group element, such as aluminum (Al), silicon (Si), Indium (In), tin (Sn) or the like, and X is either carbon or nitrogen. Of the MAX phases, MXene, having the formula $M_{n+1}X_n$ is a preferred contaminant adsorbent. For example, $Ti_3C_2$ can be added to a contaminated liquid for adsorbing barium (II) therefrom. The liquid may be, for example, at least one water by-product from at least one oilfield reservoir, such as produced water, co-produced water or a combination thereof.

These and other features of the present disclosure will become readily apparent upon further review of the following specification and drawings.

DETAILED DESCRIPTION OF THE PREFERRED EMBODIMENTS

Figure 1A:
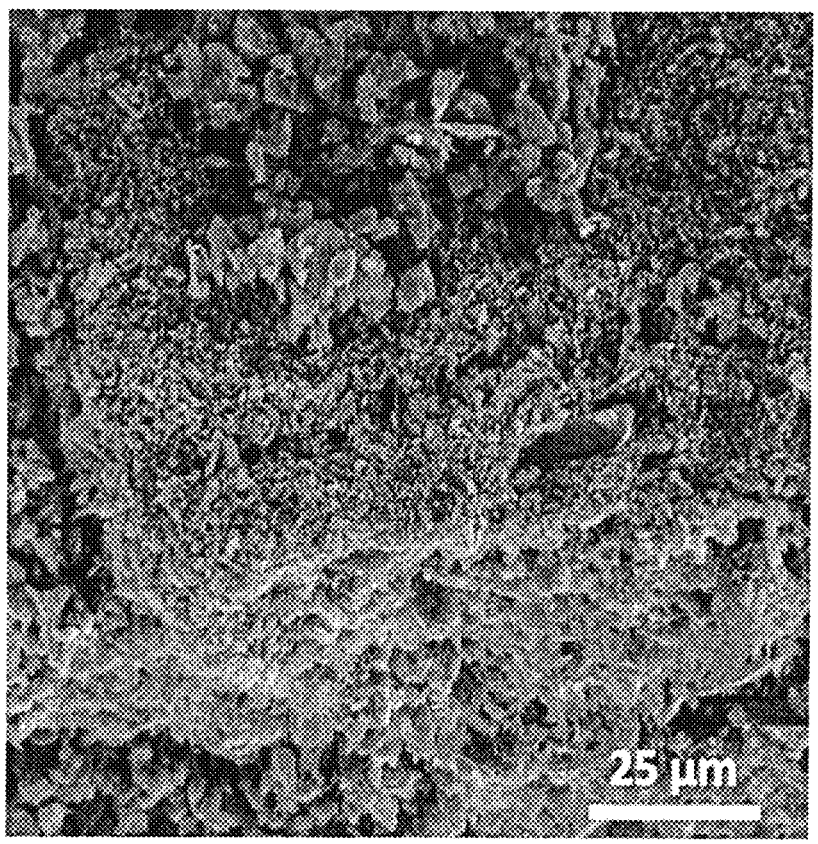
FIGS. 1A, 1B and 1C are scanning electron microscope (SEM) images of a $Ti_3C_2$ two-dimensional metal carbide water contaminant adsorbent used in a method of removing barium from a liquid.

A method for removing barium from a liquid includes using an adsorbent including a two-dimensional nanomaterial to adsorb contaminants, such as barium (II), from the liquid. The two-dimensional nanomaterial can include at least one compound from a group of layered ternary carbides and nitrides, known as MAX phases. MAX phases have the general formula $M_{n+1}AX_n$ where n=1, 2 or 3, where M is an early transition metal, such as scandium (Sc), titanium (Ti), vanadium (V), chromium (Cr), yttrium (Y), zirconium (Zr), niobium (Nb), molybdenum (Mo) or the like, A is an A-group element, such as aluminum (Al), silicon (Si), Indium (In), tin (Sn) or the like, and X is either carbon or nitrogen. Of the MAX phases, MXene, having the formula $M_{n+1}X_n$ is a preferred two-dimensional metal carbide water contaminant adsorbent. MXenes are produced by selectively etching out the A element from a MAX phase. The liquid can be water by-products from oilfield reservoirs, for example, such as produced and co-produced water.

MXenes have good structural and chemical stabilities, a large specific surface area, reducibility, good dispensability, hydrophilic surfaces, outstanding electrical conductivities, and are environmentally friendly. A preferred MXene adsorbent is Titanium (III) Carbide (II) $Ti_3C_2$. As described in detail below, $Ti_3C_2$ nanosheets can be prepared by an intercalation and exfoliation process. The $Ti_3C_2$ include nanosheets with few layers. The present inventors have found that when $Ti_3C_2$ is added to contaminated water, a contaminant, such as barium (II), can be removed therefrom. The maximum removal capacity can be 0.9 mg/g. The optimal pH for removal efficiency can be pH 5.

In experiment, the $Ti_3C_2$ water contaminant adsorbent was prepared by room temperature exfoliation of Titanium (III) Aluminum Carbide (II) $Ti_3AlC_2$ using hydrofluoric (HF) acid, as set forth in the reaction below:

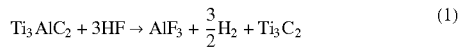  (1)

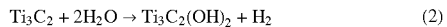  (2)

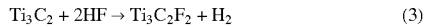  (3)

The $Ti_3C_2$ water contaminant adsorbent was added to a sample of water contaminated with barium (II) and adsorption of the barium (II) contaminant from the water was found to have a removal efficiency of up to 95%.

The adsorption capacity of the barium (II) by the $Ti_3C_2$ water contaminant adsorbent was evaluated using batch tests at different pH values, ranging from 3 to 8. 10 mL of ultra-pure water contaminated with 1 ppm (1 mg/L) of barium (II) was mixed with 10 mg of the $Ti_3C_2$ water contaminant adsorbent and left for 24 hours. The solution was mixed with a magnetic shaker at room temperature. One sample was taken immediately after 20 seconds of rigorous shaking, and other samples were taken, respectively, after 10 minutes, 30 minutes, 60 minutes, 90 minutes, 120 minutes and 1,440 minutes to determine the optimum contact time. At each sampling interval, 100 µL of solution were taken and centrifuged using a micro-centrifuge at a speed of 3,000 rpm for 5 minutes. The filtrate was taken for barium analysis using inductively coupled plasma mass spectrometry (ICP-MS).

The pH of the solution was adjusted using 0.1 M HCl and 0.1 M NaOH solutions to study the effect of pH on adsorption capacity and removal efficiency. 10 mg of the $Ti_3C_2$ water contaminant adsorbent was mixed with 10 mL of ultra-pure water and mixed for 5 minutes. After measuring the initial pH of the solution, an acid or a base was added drop-by-drop to achieve a pH of 3, 5, 6 or 8.

Adsorption capacity (AC) and removal efficiency (RE) of barium (II) in the solution by the $Ti_3C_2$ water contaminant adsorbent were found and expressed mathematically as $$AC = \frac{(C_i - C_f) \times V}{W_g} \text{ and } RE\,(\%) = \frac{(C_i - C_f)}{C_i} \times 100,$$

where $C_i$ (mg/L) is initial concentration of barium (II) in the solution, $C_f$ (mg/L) is final concentration of barium (II) in the solution, V (L) is volume of the solution containing barium, and $W_g$ is the amount of the $Ti_3C_2$ water contaminant adsorbent in the solution. As noted above, the barium analysis was conducted using inductively coupled plasma mass spectrometry (using an Aurora Elite ICP-MS manufactured by the Bruker® Corporation of Germany). The samples, taken at the different times given above, were dosed and preserved with 1:3 $HNO_3/H_2O$ prior to the testing.

Scanning electron microscopy (SEM) was performed using a Quanta 200 Environmental Scanning Electron Microscope (ESEM), manufactured by Thermo Fisher Scientific® of Delaware, with a resolution of 5 nm and a magnification of X200K to observe the morphology and structure of material. Samples were kept on aluminum stub and gold sputtered prior to imaging.

Figure 1B:
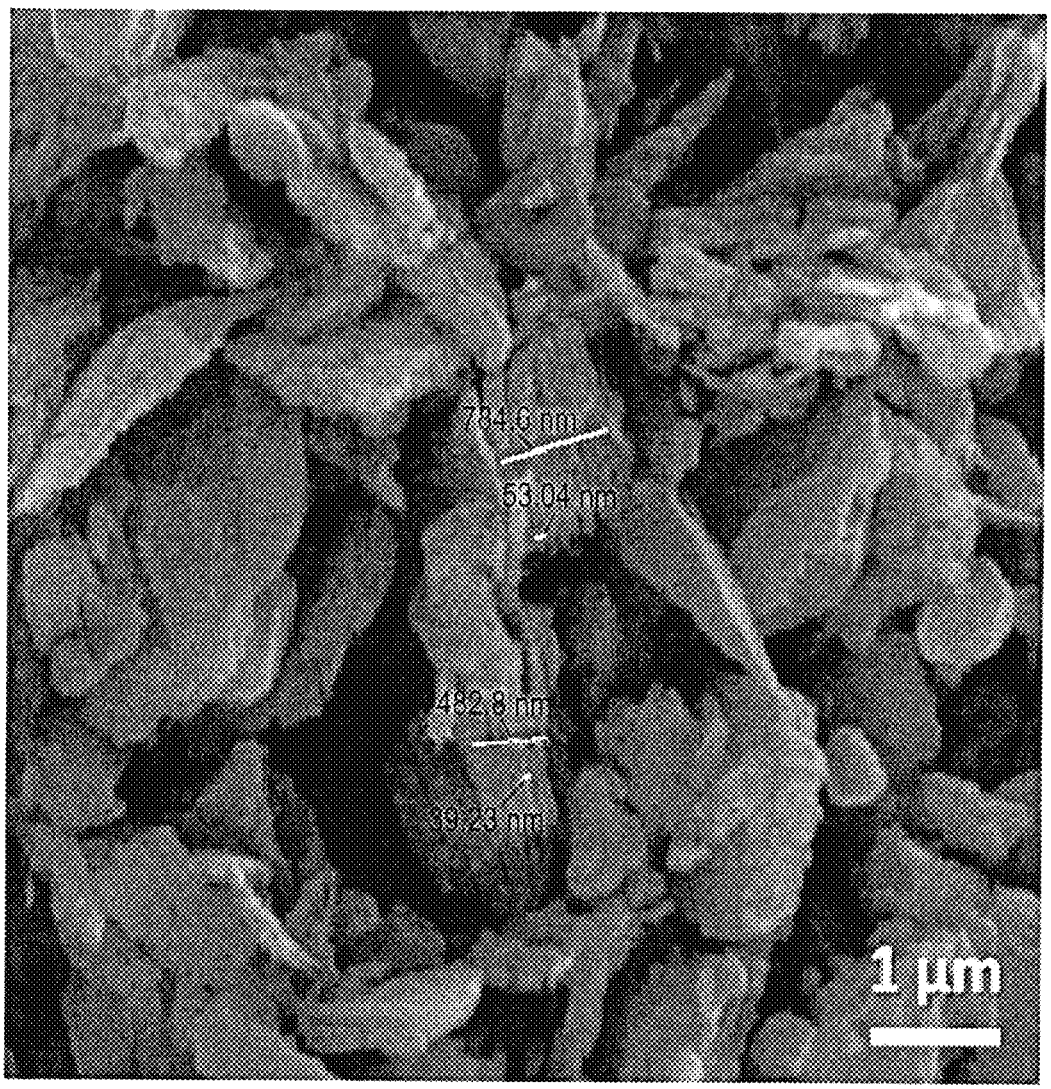
Figure 1C:
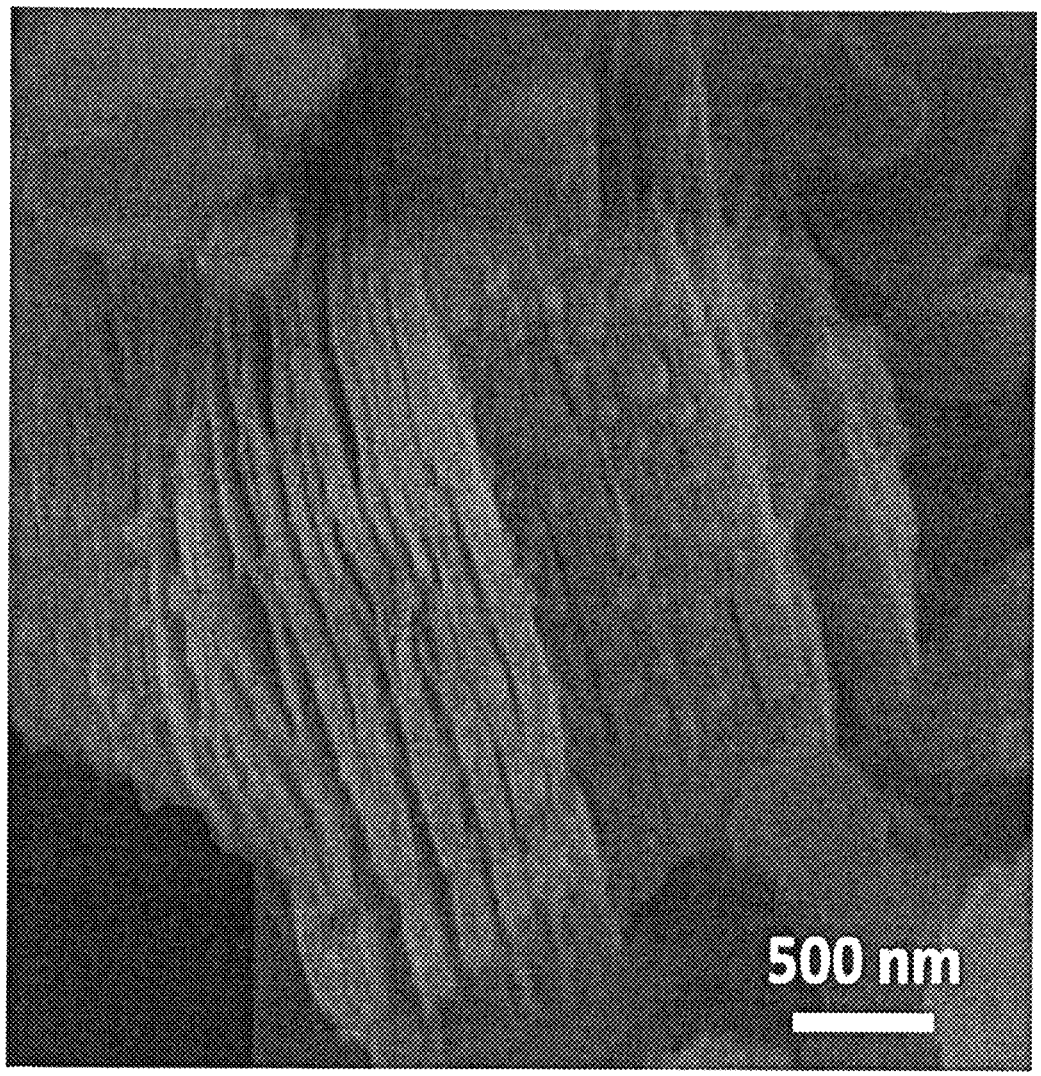

FIGS. 1A-1C are scanning electron microscope (SEM) images of $Ti_3C_2$ MXene particles produced as described above, specifically showing the $Ti_3C_2$ layers spread apart due to the exfoliation treatment by the hydrofluoric acid. The appearance of "book"-like layers shown in FIGS. 1B and 1C is caused by etching away the Al layers in the initial $Ti_3AlC_2$ particles. This is a clear indication of delamination, which is typical of MXenes. The gaps are typically 6-8 Å in size. The thickness of the $Ti_3C_2$ MXene layer with high magnification (FIGS. 1B and 1C) is around 40-50 nm. It can be clearly seen that $Ti_3C_2$ MXene contains only a few lamellar grains with densely aligned layered structures. These grains may be residual Al atoms dislodged from the $Ti_3C_2$ structure, also, with time, titanium atoms forming $TiO_2$ nanoparticles. It has been reported that there are two different types of structures for MXene, which can be observed for the two-dimensional (2D) layered edge: one is a sheet with a small ball attachment and another is clean without a ball, as shown in FIG. 1C. It is believed that the ball-like structure can be seen in the $Ti_3C_2$ MXene sheets where they nucleated and grew from HF treatment. Elemental analysis performed by X-ray photoelectron spectroscopy (XPS) confirmed this.

Figure 2:
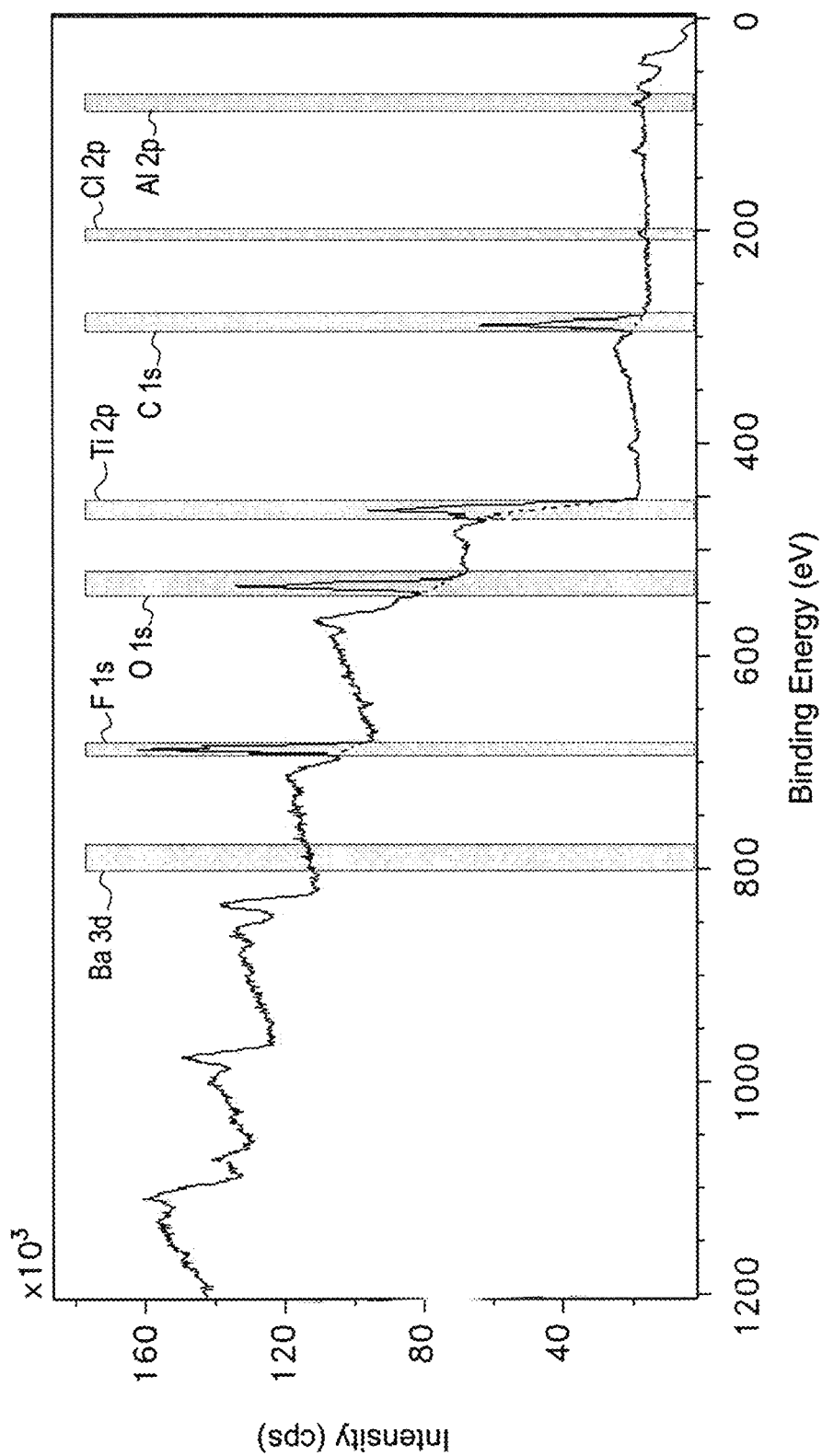
FIG. 2 is a graph illustrating X-ray photoelectron spectroscopy (XPS) results for the $Ti_3C_2$ two-dimensional metal carbide water contaminant adsorbent following adsorption of barium (II) thereby.

The 2p XPS analysis of the $Ti_3C_2$ MXene after barium adsorption (pH 3) is shown in FIG. 2. As shown, apart from peaks for Ti, C, Al and F, there is a peak for Ba. The presence of Na is due to the addition of NaOH to the solution to control the pH, and the Ba peak is for adsorption of barium (II) on the surface of the $Ti_3C_2$ MXene. The concentration of Ti, C, O, Na, Al, and Ba are calculated to be 18%, 32%, 20%, 8% and 1%, respectively. Most of the concentrations of F and Al are mainly due to formation of $AlF_3$ during the etching process of the initial $Ti_3AlC_2$.

Figure 3A:
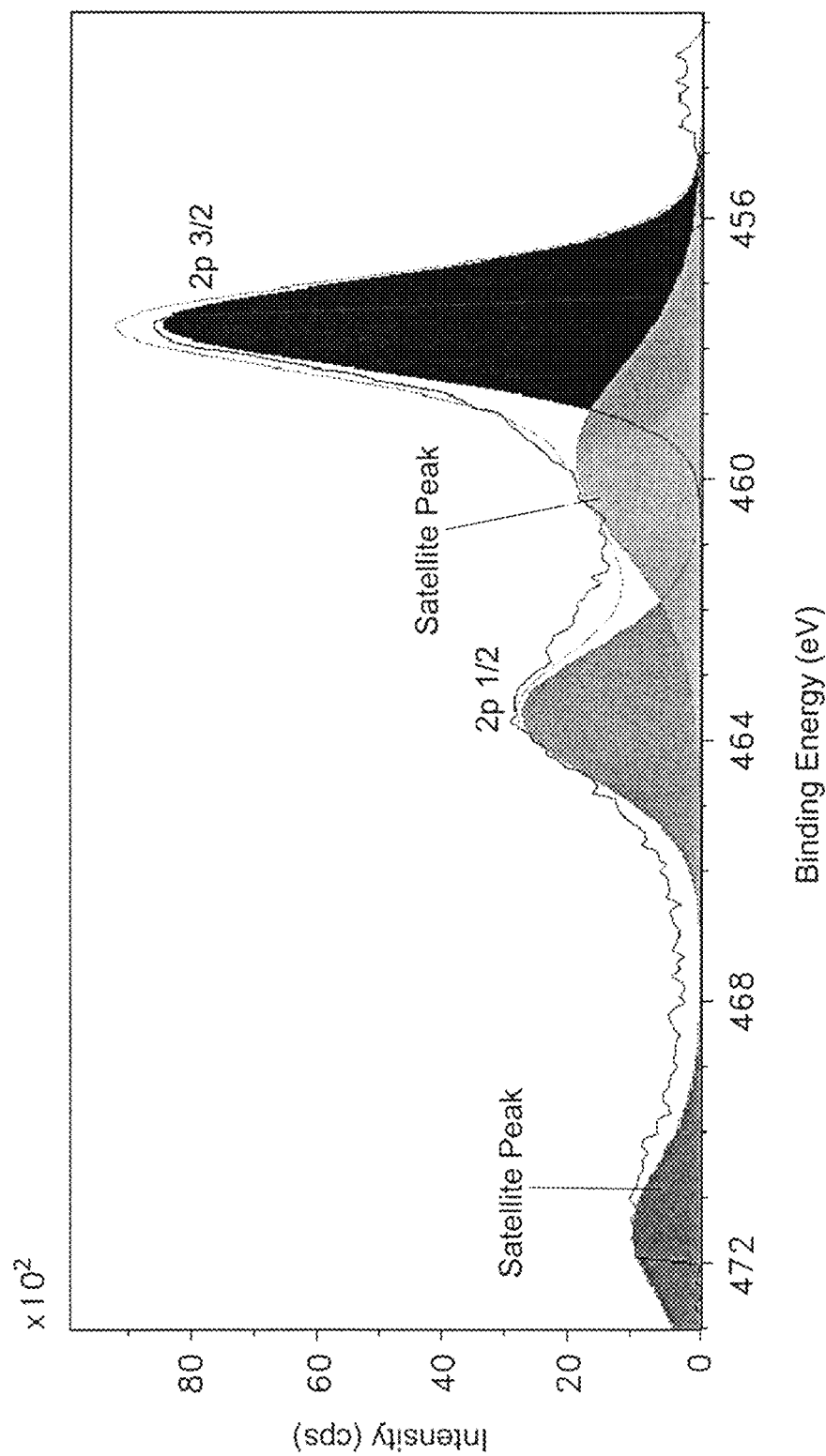
FIG. 3A is a graph showing titanium peaks of the X-ray photoelectron spectroscopy analysis of FIG. 2.
Figure 3B:
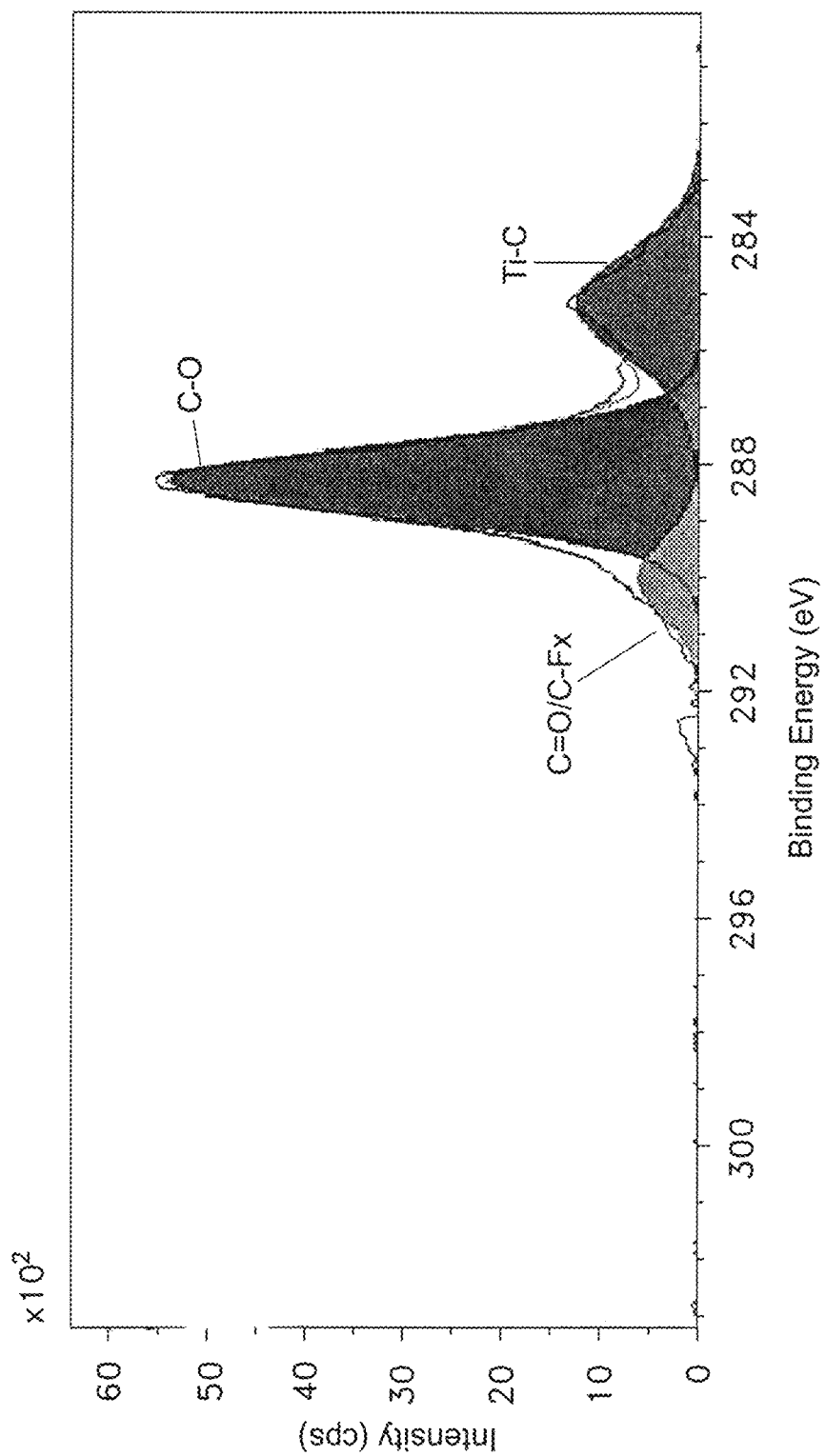
FIG. 3B is a graph showing carbon peaks of the X-ray photoelectron spectroscopy analysis of FIG. 2.
Figure 3C:
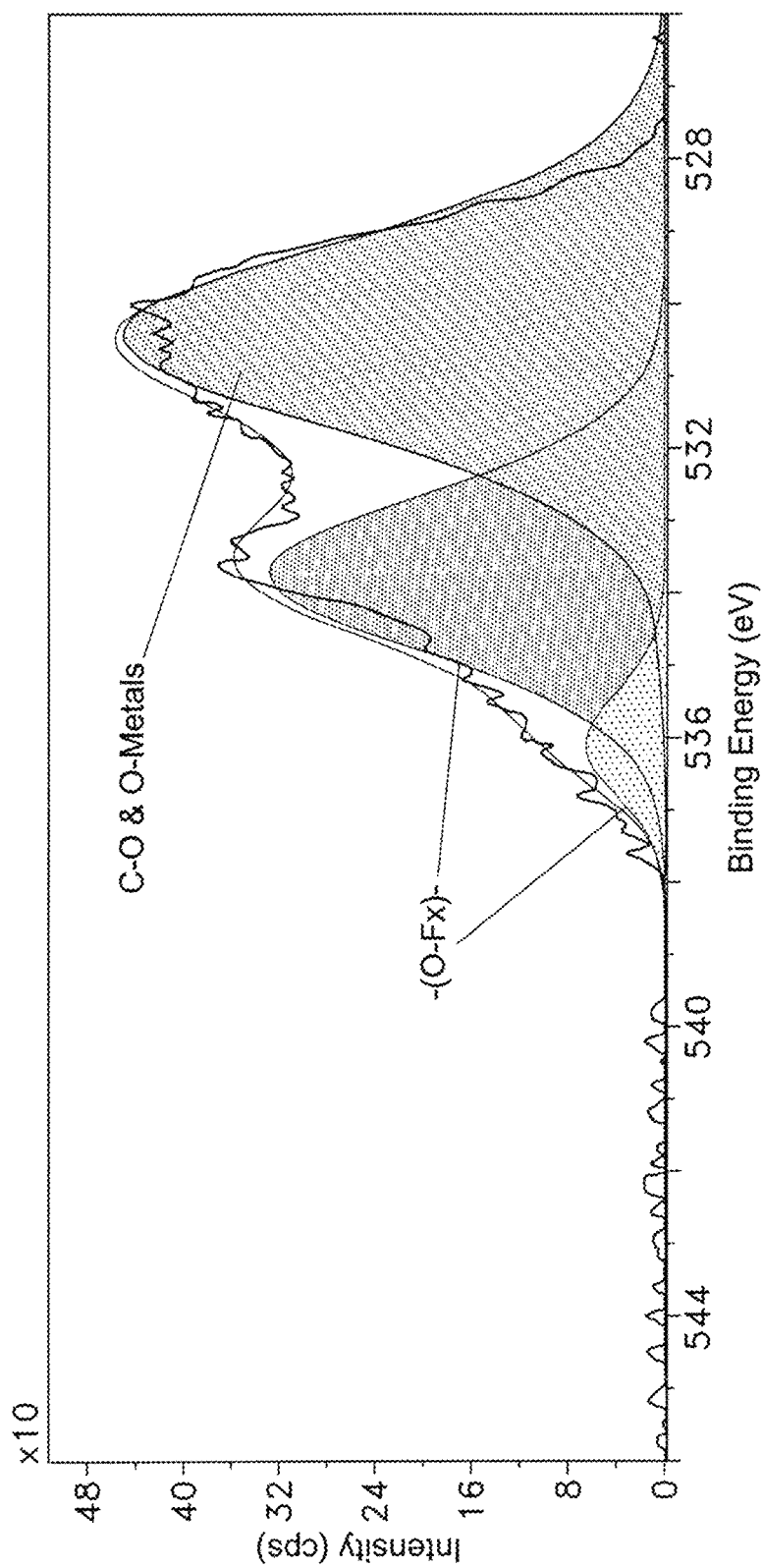
FIG. 3C is a graph showing oxygen peaks of the X-ray photoelectron spectroscopy analysis of FIG. 2.

From the spectra shown in FIG. 3A, titanium existed predominantly in the form of titanium carbide. A broader peak of 2p 2, with the presence of a satellite peak at 2p 3/2 with a maxima at 457.5 eV with a spin-orbit split component of 6.1 eV is typical of a titanium carbide phase. Carbon exists in three different chemical environments, as shown in FIG. 3B. C—O, C—Ti and C=O/C=$F_X$ are the three main peaks observed in the XPS analysis. The presence of an OH group also can be seen in the O 1s main signal (shown in FIG. 3C). 53% of oxygen present on the surface exists in the form of metal oxides/oxygen bonded to a carbon species, whereas the remaining 47% is found in the form of —(O—$F_X$).

Figure 4:
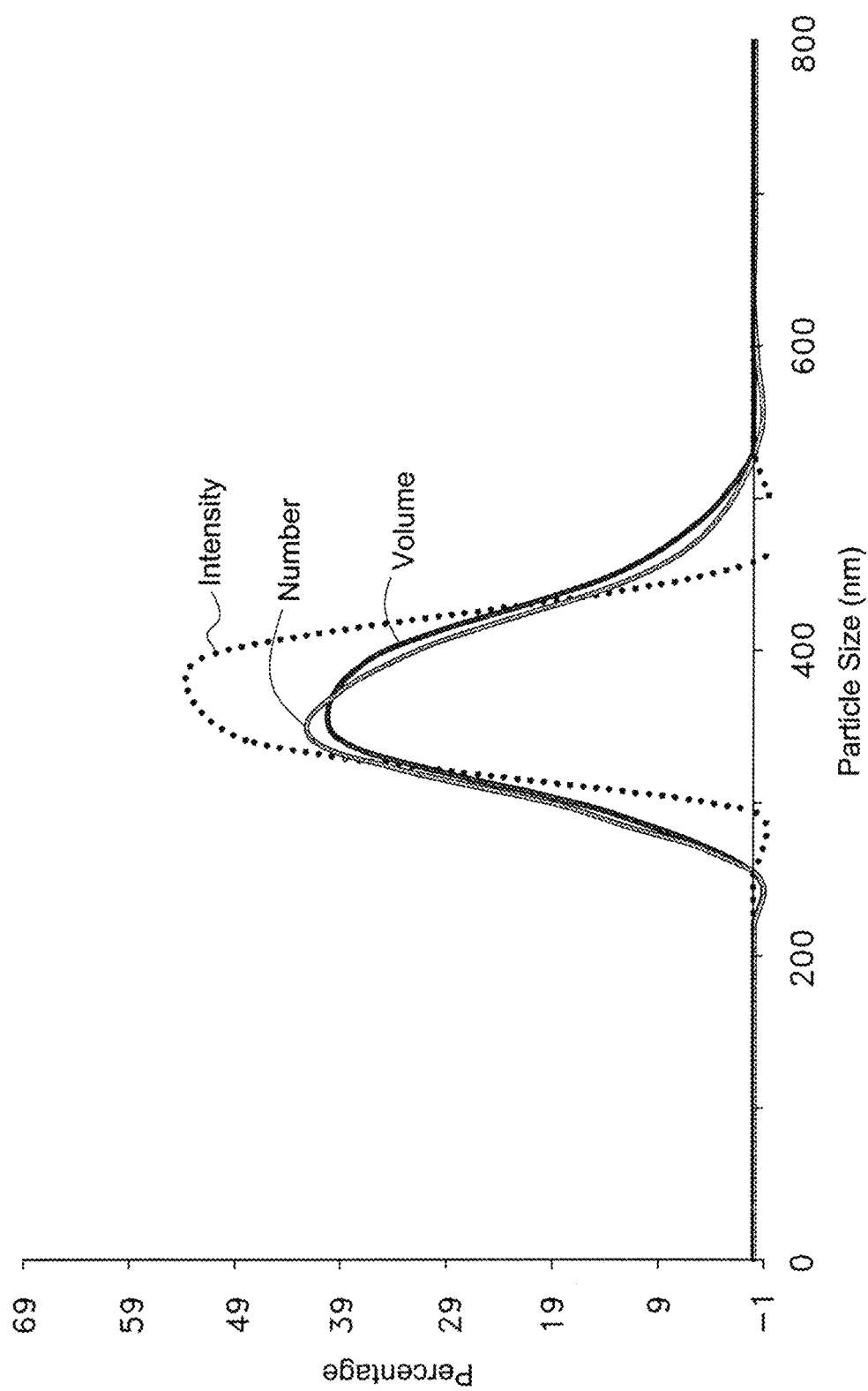
FIG. 4 is a graph showing particle size distribution of the $Ti_3C_2$ two-dimensional metal carbide water contaminant adsorbent.

An analysis of particle size and zeta potential was performed by observing the change in size and potential of the $Ti_3C_2$ MXene. The average particle size of the $Ti_3C_2$ MXene is shown in FIG. 4. The particle size distribution was calculated by intensity percentage, volume percentage, and particle number. The mean particle size of the $Ti_3C_2$ MXene was found to be about 400 nm. An MXene particle of this size is loose in structure and is easily crushed and ground into powder.

Figure 5:
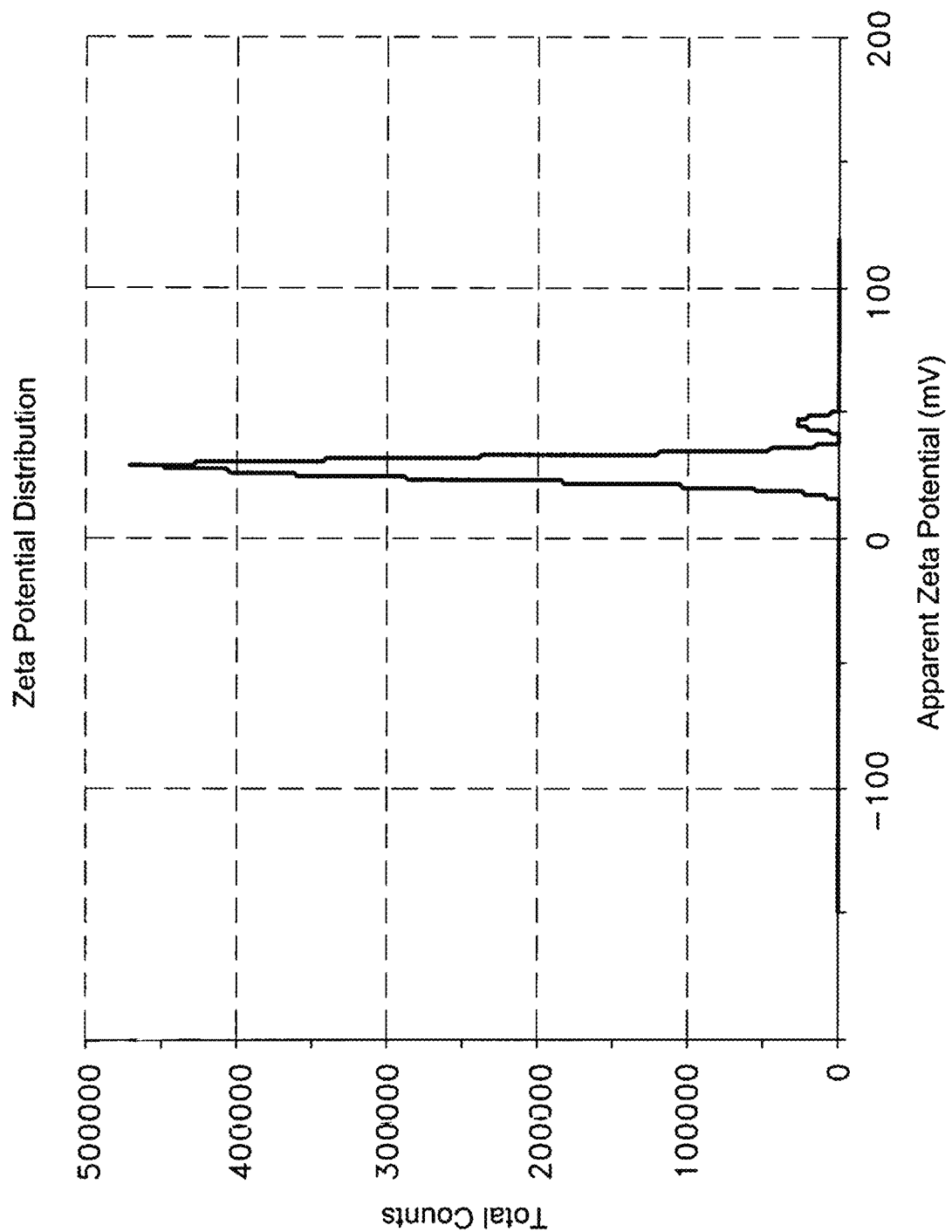
FIG. 5 is a graph showing zeta potential analysis of the $Ti_3C_2$ two-dimensional metal carbide water contaminant adsorbent.

The zeta potential of the $Ti_3C_2$ MXene is shown in FIG. 5. The zeta potential analysis provides the magnitude and a measure of the effective surface charge density associated with the double layer around the particle. It can be seen in FIG. 5 that the $Ti_3C_2$ MXene is positively charged in solution, with the existence of a repulsive electrostatic interaction in the aqueous medium.

Figure 6A:
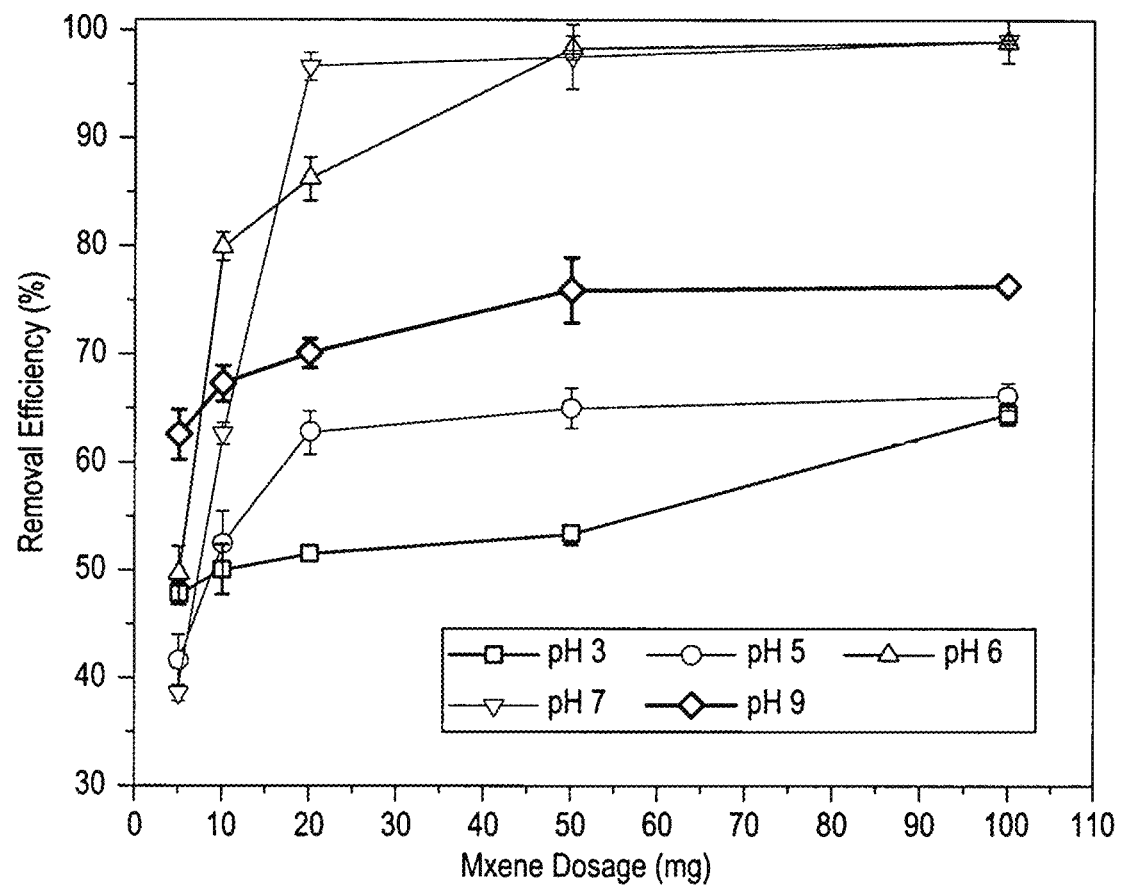
FIG. 6A is a graph showing the removal efficiency of the $Ti_3C_2$ two-dimensional metal carbide water contaminant adsorbent for barium (II).
Figure 6B:
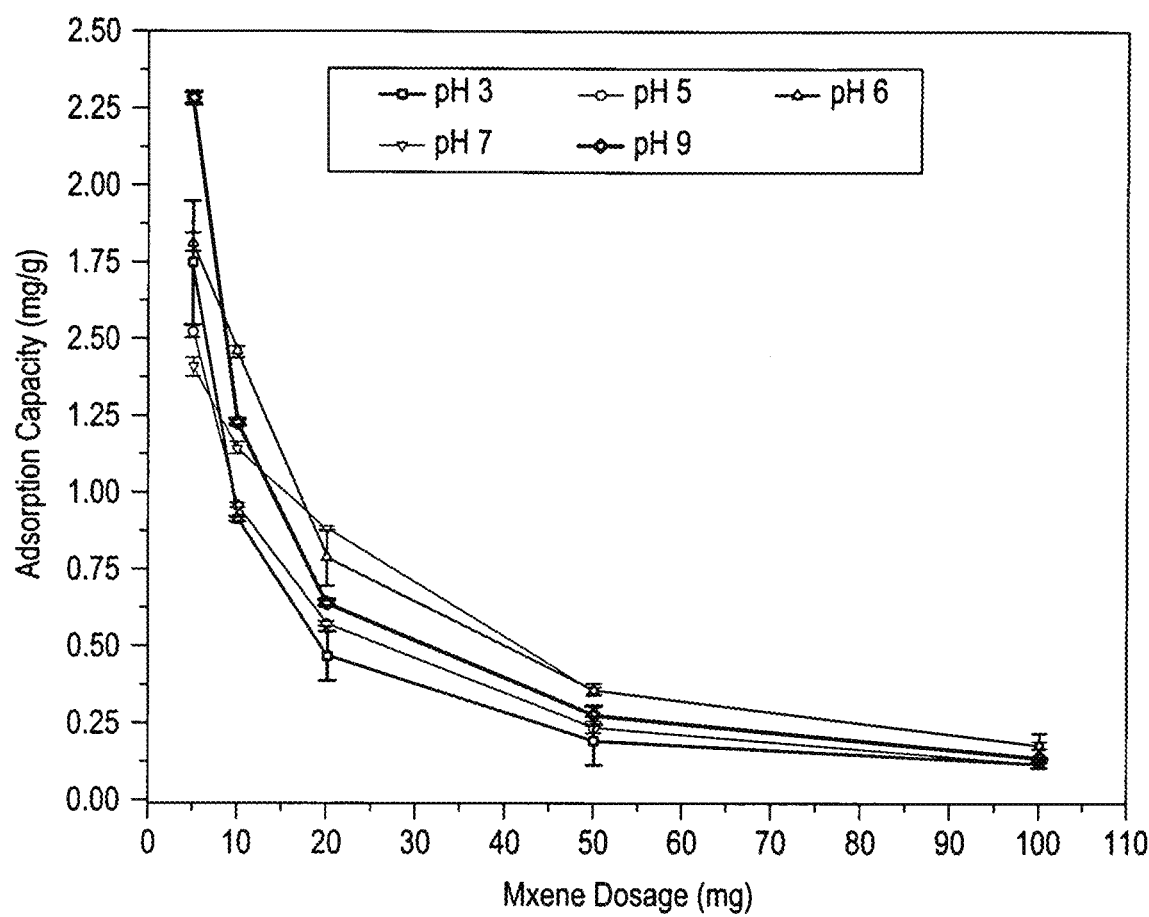
FIG. 6B is a graph showing the adsorption capacity of the $Ti_3C_2$ two-dimensional metal carbide water contaminant adsorbent for barium (II).

The pH of the medium is an important factor in adsorption processes that affects the surface charge density of the adsorbent, the degree of ionization and the speciation of adsorbate. FIGS. 6A and 6B demonstrate the effect of different pH values on the final barium concentration, removal efficiency and adsorption capacity. The pH was limited to values less than 9, since at higher pH values, metal precipitation will take place, resulting in the formation of a metal hydroxide salt. As shown in FIGS. 6A and 6B, the barium adsorption behavior of the $Ti_3C_2$ MXene is pH-dependent. The dependency can be related to both elements present in the adsorbent and the chemistry of the solution.

As can be clearly seen, maximum adsorption occurs from pH 6 to pH 7. These results indicate that surface area is not the sole parameter controlling the adsorption capacity and removal efficiency; i.e., the surface area might play a role for providing extra adsorption sites for the ions, but it is not the primary parameter in adsorption by the nanomaterial. As predicted from zeta potential measurements, the $Ti_3C_2$ MXene possesses a positive charge density at pH below 2.41 and becomes neutrally charged at pH 2.41, while it increases in negativity for the zeta potential at pH values above 2.41. Ba (II) ions also show a similar characteristic when their surface charge changes by changing the media pH. Generally, the negative and positive surface charges of the metal oxide particles change based on the pH of the solution. Their surface can be positive, negative or neutral as per the following mechanism:

$$\underset{positive}{MOH_2^+} \leftrightarrow \underset{neutral}{MOH^0} + H^+,$$

which is then followed by $$MOH^0 \leftrightarrow \underset{negative}{MO^-} + H^+.$$

At acidic pH values, the surface of the metal oxide adsorbent acts with a positive character and has less affinity for cations, while at higher pH values, they behave as negatively charged surfaces, as a result of which the uptake is a maximum at higher pH. At basic pH, metal oxides form precipitates and drop out of the bulk solution. $Ba^{2+}$ is a dominant barium speciation in normal environmental conditions. At pH values above 9, barium ions form the hydroxide complex precipitate. Therefore, barium ions are mostly protonated at pH values below 9 and, as shown in FIG. 6A, maximum adsorption occurs mostly in the pH range between 6-9, where the zeta potential of the $Ti_3C_2$ MXene is highly negative in sign, promoting more electrostatic attraction forces between the $Ti_3C_2$ MXene and barium ions. On the other hand, barium ions above pH 9 form the hydroxide and are not present in bulk solution, therefore, there will be no free barium ions to be adsorbed at the MXene surface.

The negative charge on the surface of the $Ti_3C_2$ MXene increases by increasing the pH (up to a certain pH range) of the media, thus resulting in an increase of Ba (II) ions adsorbed on the surface of the $Ti_3C_2$ MXene. The effect of initial pH on the adsorption capacity is shown in FIG. 6B. The adsorption capacity of barium on the $Ti_3C_2$ MXene increases with increasing pH, where the maximum adsorption capacity occurs at pH 6 with a value of 1.7 mg/g.

It is possible that pH can affect the Ba speciation and the MXene surface charge in the liquid medium. It is predicted that the MXene possesses positive charge density at low pH and then changes to a negative charge density at higher pH values. The Ba in aqueous media also shows similar characteristics, where their surface charges change with a changing pH. Thus, Ba adsorption varies with a changing value of pH. This phenomenon occurs due to electrostatic attraction between the negatively charged surface of the adsorbent and the positively charged Ba. ICP-MS results show that at a pH of 3 and at a pH of 8, Ti residual is higher than that of mid-range pH. It is believed that at a very low pH and a very basic pH, the Ti may separate from the MXene structure, causing damage.

Figure 7A:
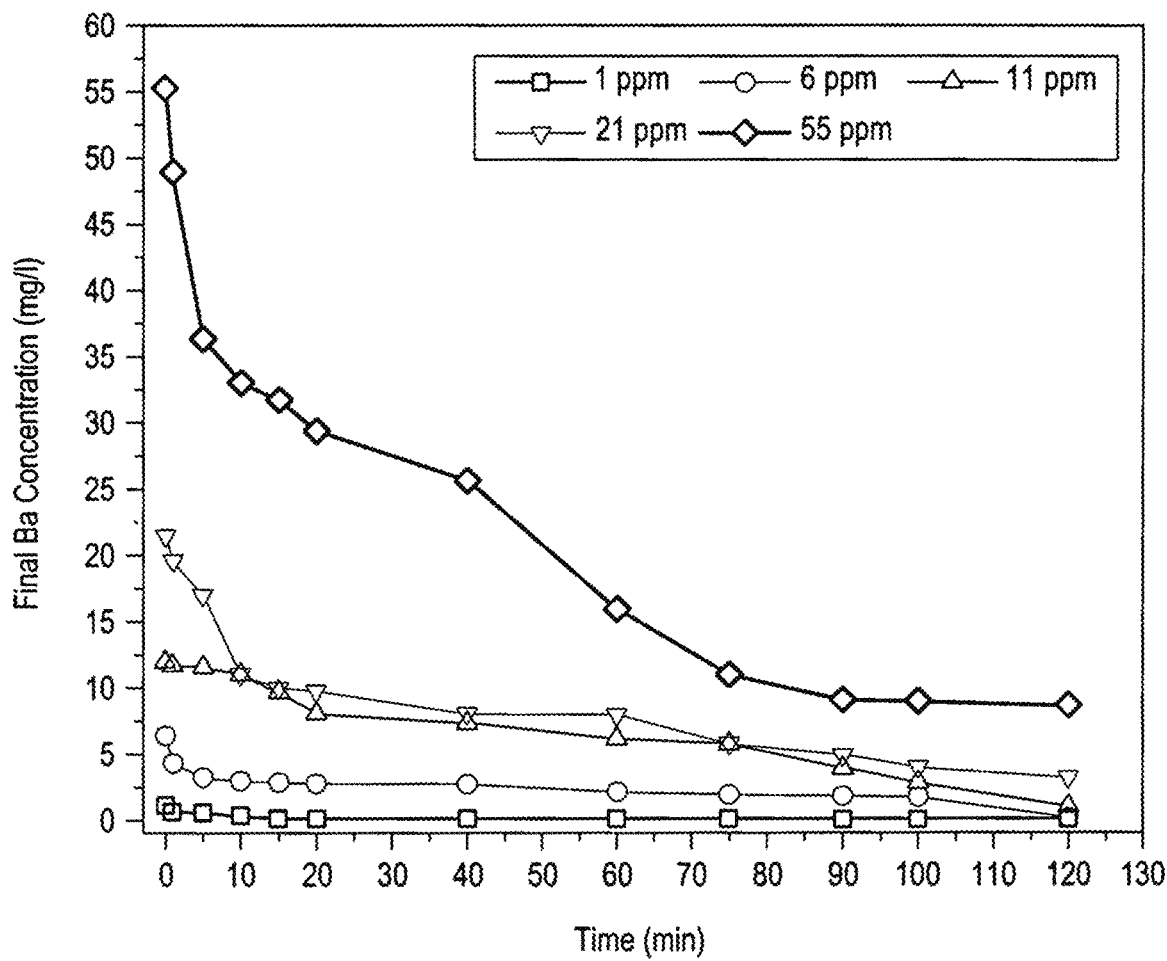
FIG. 7A is a graph illustrating the kinetics of barium (II) removal by the $Ti_3C_2$ two-dimensional metal carbide water contaminant adsorbent, in terms of final barium concentration, at different concentrations as a function of time.
Figure 7B:
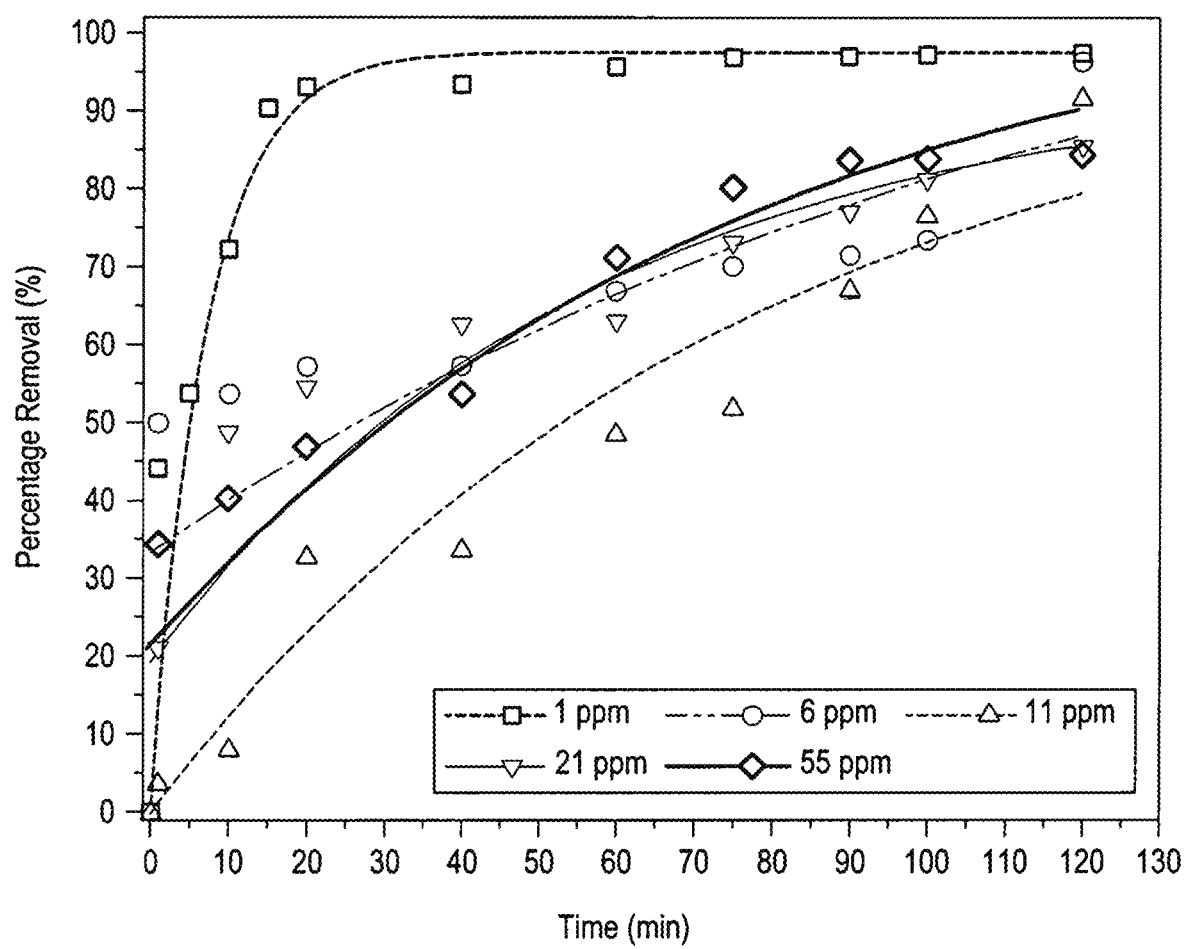
FIG. 7B is a graph illustrating the kinetics of barium (II) removal by the $Ti_3C_2$ two-dimensional metal carbide water contaminant adsorbent, in terms of percentage of barium removal, at different concentrations as a function of time.

Kinetic experiments were carried out by determining the Ba solution contents at various time intervals. The contact time was varied from 0 hours to 2 hours using 100 mg of the $Ti_3C_2$ MXene with different Ba concentrations ranging from 1 ppm to 55 ppm at pH 7. FIGS. 7A and 7B show the effect of contact time on the final barium concentration and the percentage removal of barium at different initial Ba concentrations, respectively.

95% barium removal was observed when an initial concentration of 1 ppm was used. This dropped to 80% removal at higher concentrations (i.e., 55 ppm). The kinetics and rate of adsorption of barium by the $Ti_3C_2$ MXene is one of the fastest rates compared against rates reported in the literature. It takes less than 60 minutes to fully remove barium from solution. In general, the $Ti_3C_2$ MXene showed rapid kinetics, where almost 35% of Ba (II) was removed a few seconds after contact. The rapid kinetics is mainly ascribed to the distinctive layered nanostructure of the $Ti_3C_2$ MXene, which could favor the diffusion and intercalation of barium (II) ions within the MXene nano-layers. The high removal efficiency rate at the beginning of the contact time was due to the large number of vacant binding sites available for the adsorption of barium ions. As the outside surface of MXene becomes exhausted and saturated with barium ions, the uptake rate of barium by the $Ti_3C_2$ MXene decreases and reaches equilibrium. The rapid removal, as a function of contact time, suggests that the adsorption processes apparently include two phases, namely, surface complexation, or ion-exchange, and electrostatic attraction between barium ions and the MXene surface.

The smooth and one-step adsorption process of barium ions by the $Ti_3C_2$ MXene indicates that the adsorption process does not accompany any complexity but it occurs by multilayer coverage due to a complete saturation of the surface active sites with barium ions until it reaches a saturation point, forming a strong chemical bond. Primarily, the Ba (II) ions, in a random manner, occupy many of the active sites of the $Ti_3C_2$ MXene, as a result of which the rate of adsorption is faster, and then the multi-layer adsorption takes place on the surface of the Ba ion at a lower adsorption rate. After a short time, most of the active sites are covered with barium ions; therefore, the rate of adsorption becomes relatively slower until it ultimately reaches a plateau region, indicating the MXene is saturated.

Figure 7C:
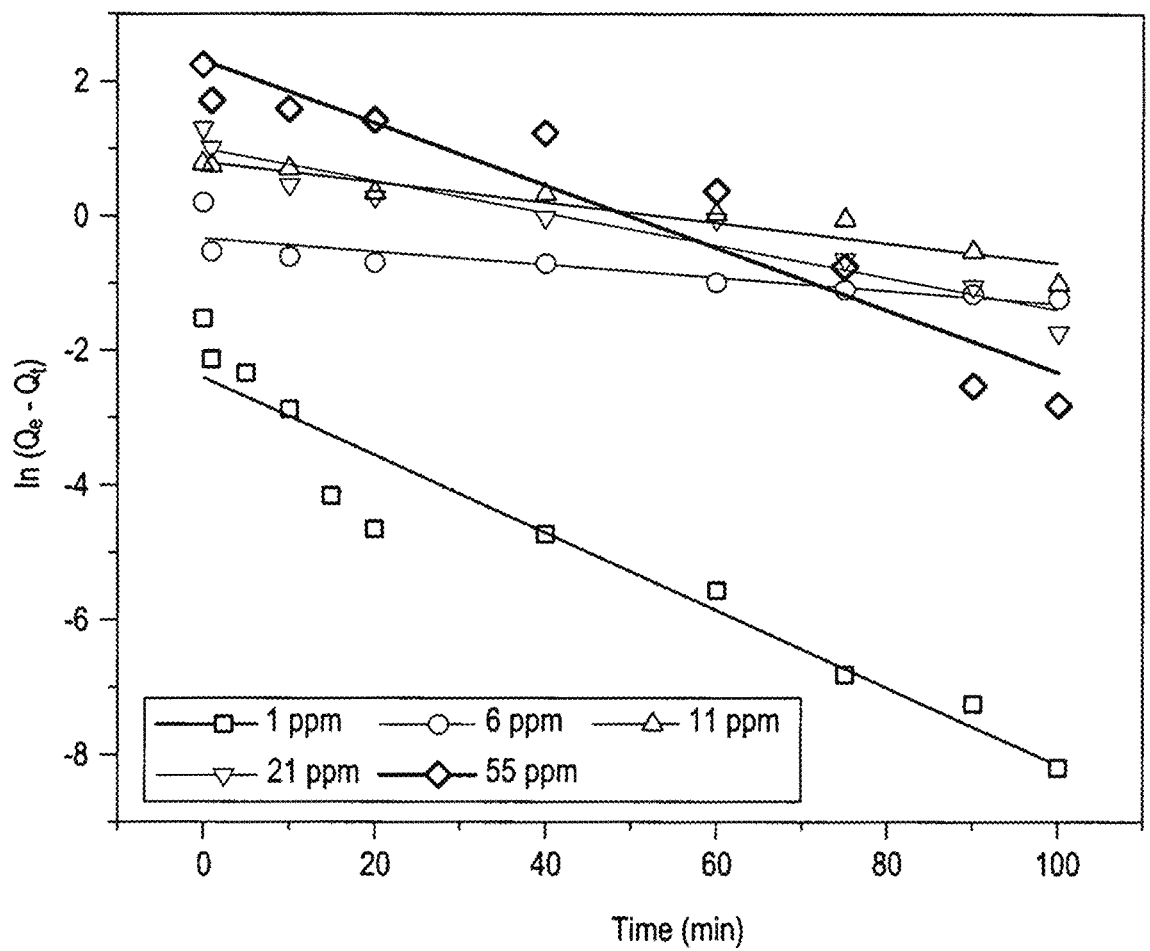
FIG. 7C is a graph illustrating a first order model fitting for barium adsorption by the $Ti_3C_2$ two-dimensional metal carbide water contaminant adsorbent.
Figure 7D:
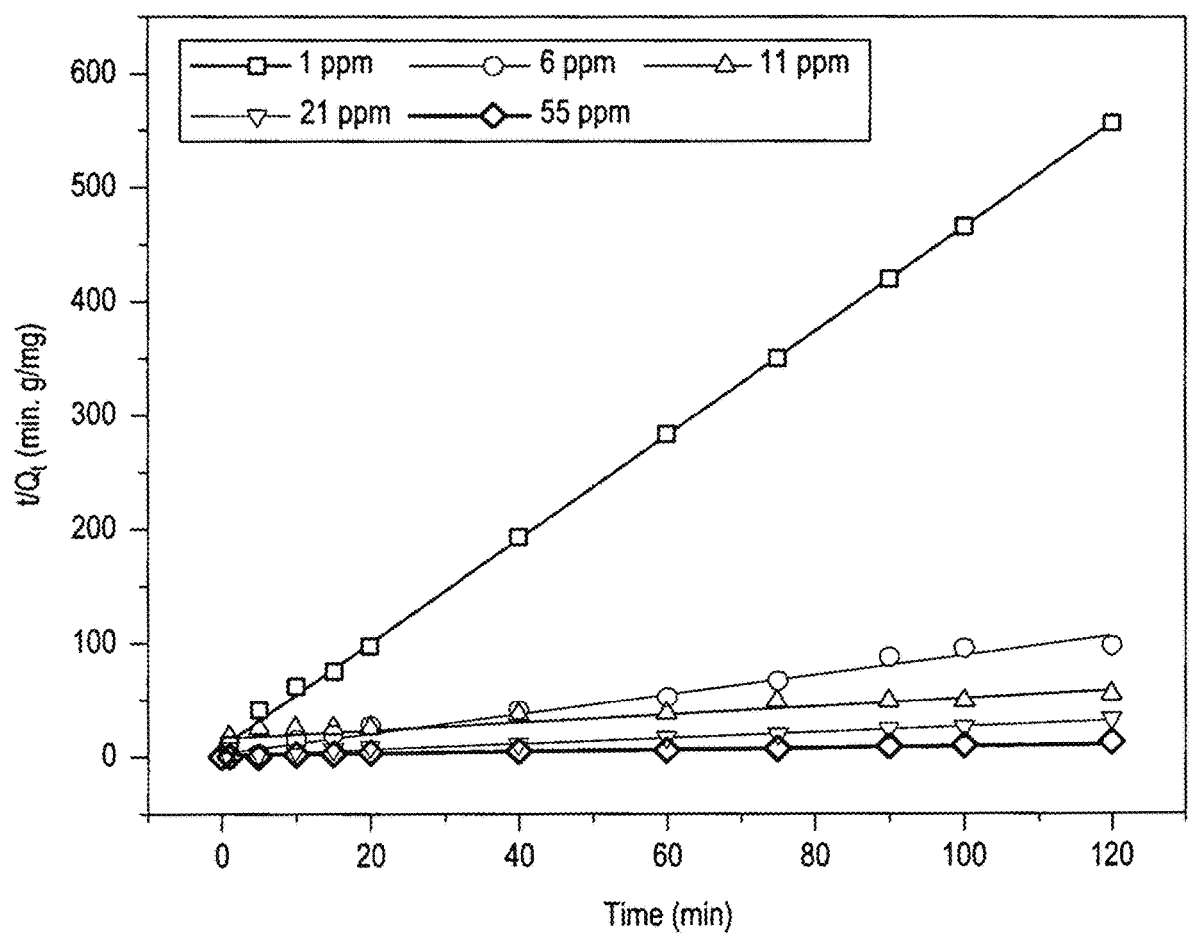
FIG. 7D is a graph illustrating a second order model fitting for barium adsorption by the $Ti_3C_2$ two-dimensional metal carbide water contaminant adsorbent.

In order to investigate the adsorption kinetics and determine the kinetic rate constants, two commonly used kinetic models were employed, namely, the Lagergren pseudo-first order model and the pseudo-second-order model. The data for barium adsorption onto MXene fit well to the pseudo-second-order model with the coefficient of determination being close to unity. The data do not show a linear behavior in the first order model and therefore the system cannot be correlated to the first order kinetic model. The $R^2$ of the linearized plots for the first order model are 0.5 to 07 $min^{-1}$ for all cases. FIGS. 7C and 7D illustrate the first order and second order model fitting for the Ba (II) adsorption, and the constants are summarized below in Table 1.

TABLE 1

| Kinetic parameters for second order model | | | |
|---|---|---|---|
| Concentration (ppm) | $Q_e$ (mg/g) | $k_2$ (g/mgh) | $R^2$ |
| 1 | 0.219 | 2.252 | 0.99 |
| 6 | 1.138 | 0.092 | 0.93 |
| 11 | 2.88 | 0.005 | 0.98 |

TABLE 1-continued

| Kinetic parameters for second order model | | | |
|---|---|---|---|
| Concentration (ppm) | $Q_e$ (mg/g) | $k_2$ (g/mgh) | $R^2$ |
| 21 | 3.75 | 0.03 | 0.98 |
| 55 | 10.06 | 0.0098 | 0.97 |

Both the calculated and experimental $Q_e$ values for barium adsorption were close to each other. The high correlation coefficient and the good agreement of experimental and calculated $Q_e$ values suggested that the adsorption kinetics of barium on the $Ti_3C_2$ MXene followed the pseudo-second-order model and interact through a chemisorption process.

It is to be understood that the method of removing barium from a liquid is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of removing barium from a liquid, comprising the steps of:
providing an MXene, having the formula $M_{n+1}X_n$, where n is an integer ranging between 1 and 3 inclusive, M is an early transition metal, and X is selected from the group consisting of carbon and nitrogen, wherein the MXene comprises $Ti_3C_2$, further wherein providing the Mxene consists of room temperature exfoliation of Titanium (III) Aluminum Carbide (II) ($Ti_3AlC_2$) using hydrofluoric (HF) acid to produce the MXene; and
adding the MXene to a liquid containing barium, the MXene adsorbing the barium from the liquid.

2. The method of removing barium from a liquid as recited in claim 1, wherein the step of adding the MXene to the liquid comprises adding the MXene to at least one water by-product from at least one oilfield reservoir.

3. The method of removing barium from a liquid as recited in claim 2, wherein the water by-product is selected from the group consisting of produced water, co-produced water and a combination thereof.

* * * * *